United States Patent
Scholz

(10) Patent No.: US 6,592,097 B1
(45) Date of Patent: Jul. 15, 2003

(54) DEVICE FOR SECURING THE POSITION OF THE ACTUATOR ROD WITH MOTOR HAVING SAFETY ACTUATION

(75) Inventor: Rudolf Scholz, Dresden (DE)

(73) Assignee: SAIA Burgess GmbH, Dresden (DE)

( * ) Notice: Subject to any disclaimer, the term of this patent is extended or adjusted under 35 U.S.C. 154(b) by 0 days.

(21) Appl. No.: 09/574,097

(22) Filed: May 18, 2000

(30) Foreign Application Priority Data

May 20, 1999 (DE) ................................ GM299 08 901 U

(51) Int. Cl.⁷ ............................................... F16K 51/00
(52) U.S. Cl. ........................ 251/103; 251/108; 251/284
(58) Field of Search ................................ 251/284, 103, 251/107, 108, 101, 102, 109, 110; 222/153.13, 153.14

(56) References Cited

U.S. PATENT DOCUMENTS

| | | | | |
|---|---|---|---|---|
| 712,353 A | * | 10/1902 | Ansley | 251/108 |
| 2,030,510 A | * | 2/1936 | Griffiths | 251/101 |
| 2,647,532 A | * | 8/1953 | Hopwood | 251/108 X |
| 3,169,672 A | * | 2/1965 | Soffer et al. | 251/108 X |
| 4,332,267 A | * | 6/1982 | Evans | 251/159 X |
| 4,944,484 A | * | 7/1990 | Hostetler | 251/101 |
| 5,386,600 A | * | 2/1995 | Gilbert, Sr. | 251/101 X |

FOREIGN PATENT DOCUMENTS

| | | | | |
|---|---|---|---|---|
| CH | 162706 | * | 7/1933 | 251/107 |
| DE | 1 757 891 | | 12/1957 | |
| DE | 1 140 037 | | 5/1960 | |
| DE | 25 06 453 | | 2/1975 | |
| FR | 731300 | * | 8/1932 | 251/107 |
| GB | 276780 | * | 10/1927 | 251/107 |
| GB | 2 147 974 A | | 5/1985 | F16K/35/00 |
| NL | 53518 | * | 5/1941 | 251/107 |

OTHER PUBLICATIONS

62–63286 Patents Abstracts of Japan—Sodium Valve.

* cited by examiner

Primary Examiner—Ehud Gartenberg
Assistant Examiner—John Bastianelli
(74) Attorney, Agent, or Firm—Norris McLaughlin & Marcus, P.A.

(57) ABSTRACT

A motor providing safety actuation including a spring which, during the power outage, is designed to close a valve by moving a valve cone towards a valve opening. For installation or transportation of such valves with motors, it is desirable to lock the valve actuation rod. A device is described for securing a resilient locking element to the valve cone which is mounted on a valve actuating rod. In the desired installation position, the locking element is in a force-transmitting engagement with a guide mechanism of the actuating rod so as to lock the actuating rod in a position or, alternatively, engages in a formfitting manner with a recess of the guide mechanism of the actuating rod. To secure the actuating rod in position in a force-transmitting or formfitting manner, the motor is powered until the valve actuating rod is sufficiently retracted. Subsequently, a mechanical connection is established between the resilient locking element and the guide mechanism of the actuating rod. After the motor is installed, the actuating rod is released by further retracting the valve actuating rod.

8 Claims, 2 Drawing Sheets

DEVICE FOR SECURING THE POSITION OF THE ACTUATOR ROD WITH MOTOR HAVING SAFETY ACTUATION

BACKGROUND OF THE INVENTION

1. Field of the Invention

The present invention relates to a device for securing an actuator rod into a locked position which is utilized for locking a valve actuation rod with motor during transport.

2. Description of the Related Art

A motor in which a spring returns and thereby closes the valve during a power outage is referred to as a motor with safety actuation.

The safety device-for safety actuation should close the valve with a predetermined force. Since the valve actuating rod is pretensioned, the safety device will extend farther than the required valve travel when the motor is not installed in the valve. Consequently, a motor can not be installed in a valve in this position without sustaining mechanical damage.

According to a first possible design, the aforedescribed motor is installed by powering the motor up at the valve manufacturer's site before the installation, whereby the valve actuating rod is retracted and thus installed in this position. The motor can subsequently be operated normally.

According to a second possible design, the valve actuating rod is retracted at the manufacturer's site by operating the motor and then secured in position by a separate stop motion device (which represents an additional throw-away part). The motor must be energized before installation, the additional part removed, and the motor can be installed in the energized state.

SUMMARY OF THE INVENTION

It is an object of the invention to provide a locking device for safety actuation of a valve drive with a motor wherein the position of the actuator rod can be reliably set when the motor is transported and installed without the need to power the motor or to use an additional throw-away part.

A solution of this object according to the invention is provided by a device suitable for securing the position of the valve actuating rod of a motor with safety actuation. Accordingly, the valve actuating rod can be locked in a position suitable for assembly or transportation by implementing a flexible locking element, which is secured to the valve cone positioned on the actuating rod. The locking element engages with a recess of guide mechanism attached to the motor housing in a formfitting way to lock the actuating rod into position. In the alternative, upon retracting the actuating rod with the valve cone, the locking element disengages from the recess of the guide mechanism and the actuating rod is in a released state.

The invention is based on the concept of securing an resilient locking or latching element to the valve cone of the valve actuating rod, wherein in the desired installation position the locking or latching element is in force-transmitting engagement with the guide mechanism of the actuating rod so as to fix and lock the actuating rod in position or, alternatively, engages in a formfitting manner with a recess of the guide mechanism of the actuating rod.

To fix or secure the actuating rod in position in a force-transmitting or formfitting manner, the motor is powered until the valve actuating rod is sufficiently retracted. Subsequently, a mechanical connection is established between the resilient locking element and the guide mechanism of the actuating rod. After the motor is installed, the actuating rod is unlocked and released by further retracting the valve actuating rod 5. The locking element may also have a catch which extends tangentially, or radially inwardly or outwardly.

Other objects and features of the present invention will become apparent from the following detailed description considered in conjunction with the accompanying drawings. It is to be understood, however, that the drawings are intended solely for purposes of illustration and not as a definition of the limits of the invention, for which reference should be made to the appended claims.

BRIEF DESCRIPTION OF THE DRAWINGS

In the drawings, wherein like reference numerals delineate similar elements throughout the several views.

DETAILED DESCRIPTION OF THE PRESENTLY PREFERRED EMBODIMENTS

Figure 3:
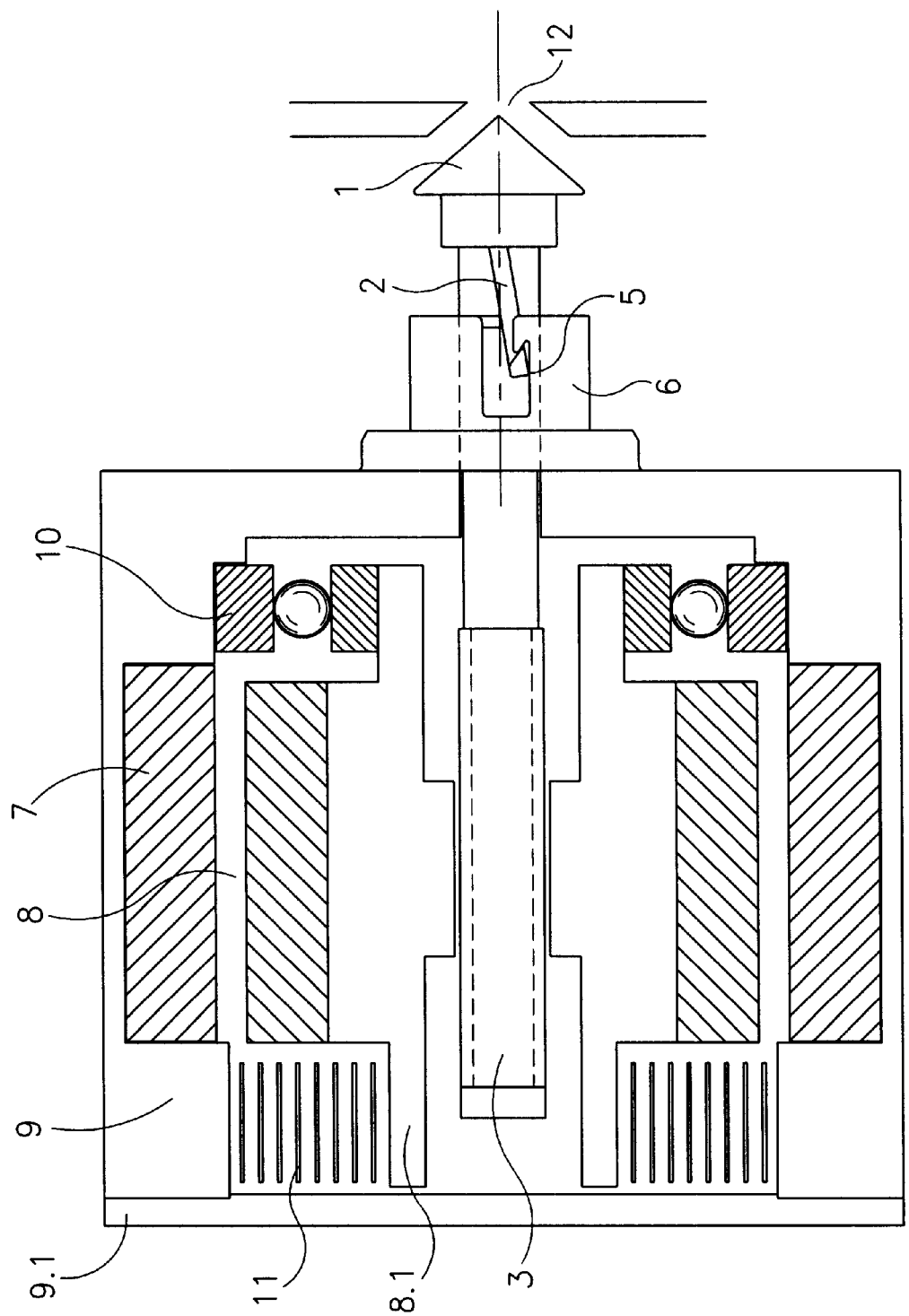
FIG. 3 illustrates the overall assembly of a locking device for safety actuation of a valve drive with a motor.

FIG. 3 shows an overall assembly which includes a device for securing the position of an actuating rod connected to a valve cone. A known motor assembly is shown which includes a rotor magnet 8, a stator 7, a ball bearing assembly 10 and a spring with safety adjustment 11, mounted on a rotor hub 8.1. It is known that such spring with safety adjustment 11 facilitates a movement of the valve actuation rod 3 so that the valve closes upon power outage (the valve cone 1 is moved towards the valve opening 12).

Figure 1:
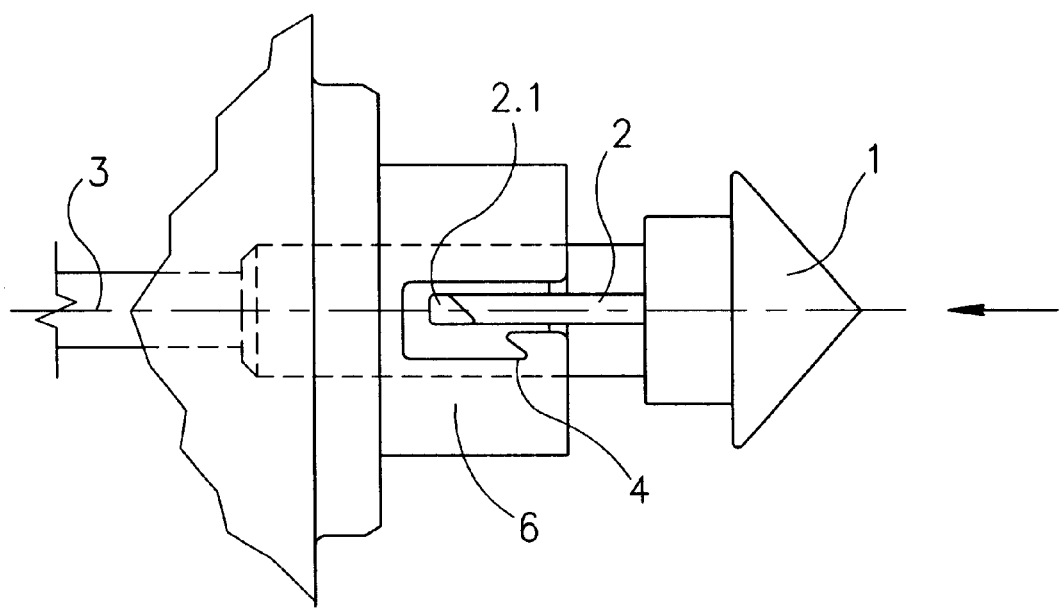
FIG. 1 illustrates an embodiment with a formfitting connection between the locking element and the guide mechanism of the actuating rod, with the locking device in a released state.
Figure 2:
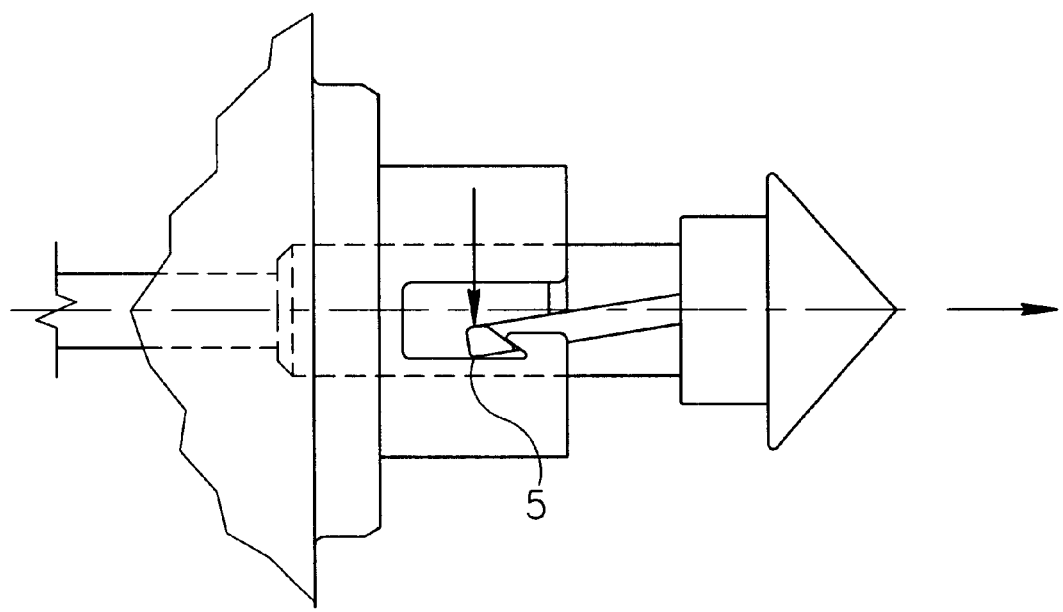
FIG. 2 illustrates embodiment with a formfitting connection between the locking element and the guide mechanism of the actuating rod, with the locking device in a state where the elements of the locking device are engaged.

FIG. 1 shows the valve actuating rod 3 attached to valve cone 1 in a retracted position. The resilient locking element 2 is secured to the back side of the valve cone 1 of the valve actuating rod 3. The locking element 2 is manufactured together with valve actuating rod by plastic injection molding. The end piece 2.1 of the locking element 2 and the recess 4 located in the guide mechanism 6 of the actuating rod have a matching form in the shape of a hook. FIG. 2 shows the valve actuating rod 3 in a locked position in which the end piece of the locking element 2.1 matches with the recess 4 in a predetermined position 5.

To latch the locking device, the motor must be powered so that the valve actuating rod 3 retracts. The resilient locking element 2 deforms by mechanical engagement so as to automatically latch with the recess 4 of the guide mechanism 6 of the actuating rod when the valve actuating rod 3 extends.

The valve actuating rod 3 is locked in a predetermined position 5 through formfitting engagement between the locking element 2 and the recess 4 in the guide mechanism 6 of the actuating rod, as shown in FIG. 2.

The motor is installed in the aforedescribed state. After installation, the first action is to retract the valve actuating rod 3. This action releases the locked position so that the locking element 2 returns to its initial position and the motor continues to operate normally.

The resilient locking element 2 should be designed so that it can neither be damaged nor broken off when released, and that it cannot, automatically lock without external intervention.

Thus, while there have been shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Substitutions of elements from one described embodiment to another are also fully intended and contemplated. It is also to be understood that the drawings are not necessarily drawn to scale but that they are merely conceptual in nature. It is the intention, therefore, to be limited only as indicated by the scope of the claims appended hereto.

What is claimed is:

1. A device for securing a position during assembly of a valve actuating rod of a valve of a motor with a spring safety actuation element, the device comprising:
    a valve actuating rod connected to a valve cone;
    the valve actuating rod being axially moveable between a first and a second position independent of an open or closed state of the valve;
    a resilient locking element attached to the valve cone;
    a guide mechanism for the valve actuating rod associated with a motor housing;
    the resilient locking element having a formed end piece;
    the guide mechanism having a recess formed to accommodate in a locking manner the formed end piece of the resilient locking element when the actuating rod is brought from the first into the second position to secure a position during assembly of the valve actuating rod of a valve of a motor with a spring safety actuation element.

2. The device according to claim 1, wherein the valve actuating rod is locked by providing a force transmitting connection between the locking element and the guide mechanism of the actuating rod.

3. The device according to claim 1, wherein the formfitting connection between the end piece of the locking element and the recess of the guide mechanism of the actuating rod has the form of a hook.

4. A device for securing a position during assembly of a valve actuating rod of a valve of a motor with a spring safety actuation element, the device comprising:
    a valve actuating rod connected to a valve cone;
    the valve actuating rod being axially moveable between a first and a second position, the valve remains open when the valve actuating rod is in either the first or second positions;
    a resilient locking element attached to the valve cone;
    a guide mechanism for the valve actuating rod associated with a motor housing;
    the resilient locking element having a formed end piece;
    the guide mechanism having a recess formed to accommodate in a locking manner the formed end piece of the resilient locking element when the actuating rod is brought from the first into the second position to secure a position during assembly of the valve actuating rod of a valve of a motor with a spring safety actuation element.

5. The device according to claim 4, wherein the valve actuating rod is locked by providing a force transmitting connection between the locking element and the guide mechanism of the actuating rod.

6. The device according to claim 4, wherein the formfitting connection between the end piece of the locking element and the recess of the guide mechanism of the actuating rod has the form of a hook.

7. A device for securing a position during assembly of a valve actuating rod of a valve of a motor with a spring safety actuation element, the device comprising:
    a valve actuating rod connected to a valve cone and axially moveable between a first position and a second position;
    a resilient locking element attached to the valve cone and terminating in a formed end piece, the resilient locking element being deflectable upon the application of a force substantially perpendicular to an axis of the valve actuating rod to a locked, deflected position while moving the actuating rod in a forward axial direction from the first position to the second position; and
    a guide mechanism having a recess defined therein to engage in a locking manner the formed end piece of the resilient locking element while in the locked position when the actuating rod is moved in an axial direction from the first to the second position, the end piece being disengageable from the recess of the guide mechanism when the actuating rod is moved in a reverse axial direction from the second position to the first position to secure a position during assembly of the valve actuating rod of a valve of a motor with a spring safety actuation element.

8. The device according to claim 7, wherein the valve remains open when the valve actuating rod is in either the first or second positions.

* * * * *